United States Patent
Lin

(10) Patent No.: US 6,837,642 B1
(45) Date of Patent: Jan. 4, 2005

(54) LENGTH ADJUSTMENT MECHANISM OF EXPANDABLE ROD

(76) Inventor: Chia-Sheng Lin, P.O. Box 453, Taichung (TW)

( * ) Notice: Subject to any disclaimer, the term of this patent is extended or adjusted under 35 U.S.C. 154(b) by 91 days.

(21) Appl. No.: 10/400,682

(22) Filed: Mar. 28, 2003

(51) Int. Cl.$^7$ .................................................. F16B 7/10
(52) U.S. Cl. ...................... 403/109.1; 403/377; 74/109; 74/405; 74/422
(58) Field of Search .......................... 403/109.1, 109.7, 403/109.8, 110, 373, 374.1, 374.2, 374.5, 377; 74/422, 109, 89.17, 575–578, 405; 192/89.21; 15/144.4; 410/151

(56) References Cited

U.S. PATENT DOCUMENTS

| | | | | |
|---|---|---|---|---|
| 619,047 A | * | 2/1899 | Mayer | .......................... 74/422 |
| 975,660 A | * | 11/1910 | Waggoner et al. | ........ 74/422 X |
| 1,135,299 A | * | 4/1915 | Larsen | |
| 1,218,021 A | * | 3/1917 | Walther | ........................ 74/422 |
| 1,725,329 A | * | 8/1929 | Blandford | |
| 3,815,289 A | * | 6/1974 | Hoffman | .................... 74/422 X |
| 4,046,019 A | * | 9/1977 | Phillips | ..................... 74/422 X |
| 4,061,300 A | * | 12/1977 | Takahashi | |
| 5,443,342 A | * | 8/1995 | Huang | ......................... 410/151 |
| 5,897,085 A | * | 4/1999 | Cronin | |
| 5,947,666 A | * | 9/1999 | Huang | ......................... 410/151 |
| 5,988,963 A | * | 11/1999 | Shiau | .......................... 410/151 |
| 6,247,882 B1 | * | 6/2001 | Huang | ......................... 410/151 |
| 2002/0056329 A1 | * | 5/2002 | Ramussen | ................... 74/89.17 |

* cited by examiner

Primary Examiner—John R. Cottingham
Assistant Examiner—Ryan M. Flandro
(74) Attorney, Agent, or Firm—Alan D. Kamrath; Nikolai & Mersereau, P.A.

(57) ABSTRACT

The length adjustment of an expandable rod is attained by a drive gear and a driven gear which is engaged with the drive gear and gear slots of an inner tube of the expandable rod. The inner tube is located inside an outer tube of the expandable rod by a locating member which is provided with a locating projection capable of locating in one of the gear slots of the inner tube.

4 Claims, 11 Drawing Sheets

LENGTH ADJUSTMENT MECHANISM OF EXPANDABLE ROD

BACKGROUND OF THE INVENTION

1. Field of the Invention

The present invention relates generally to an expandable rod, and more particularly to a mechanism for adjusting length of the expandable rod.

2. Description of Related Art

The conventional expandable rod is widely used in the truck for locating loads and is provided with a gear mechanism for adjusting length of the expandable rod. The gear mechanism comprises a gear, a gear-locating device, a spring, and a control lever. The gear mechanism is defective in design in that the length adjustment of the expandable rod can not be attained with ease and speed, and that the components of the gear mechanism are not shielded to prevent them from being damaged by impact.

SUMMARY OF THE INVENTION

The primary objective of the present invention is to provide an expandable rod with a length adjustment mechanism free of the deficiencies of the conventional expandable rod described above.

In keeping with the principle of the present invention, the foregoing objective of the present invention is attained by an adjustment mechanism comprising a support frame for fastening pivotally a first gear and a second gear such that the first gear is engaged with the gear slots of an inner tube of the expandable rod, and that the second gear is engaged with the first gear. The second gear is provided with a single bevel edge, which is engaged with the actuating piece of an actuating shaft at the time when the actuating shaft is turned counterclockwise, thereby causing the second gear to turn so as to drive the first gear. As the first gear is driven to turn by the second gear, the inner tube is actuated by the first gear in motion to expand.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
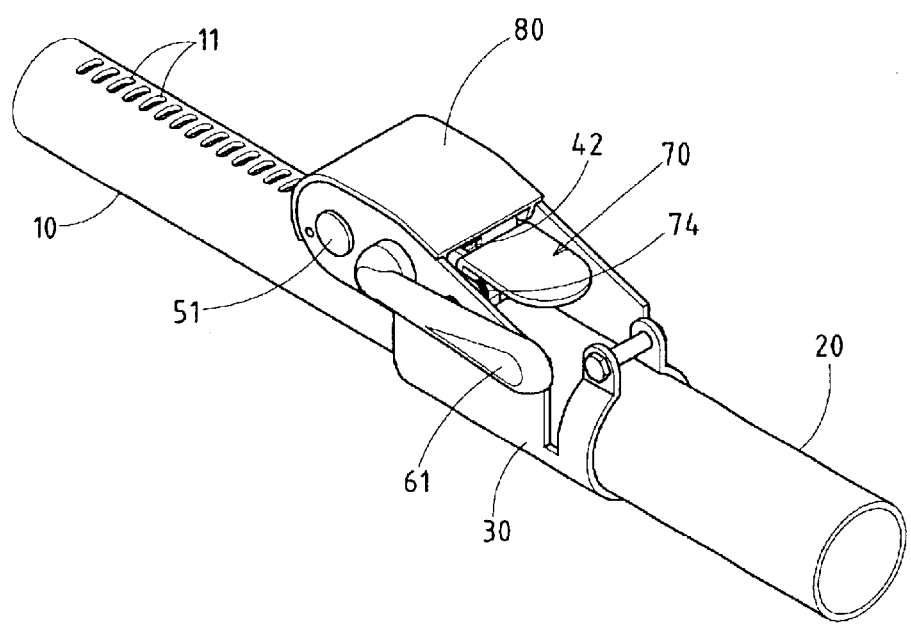
FIG. 1 shows a perspective view of a first preferred embodiment of the present invention.
Figure 2:
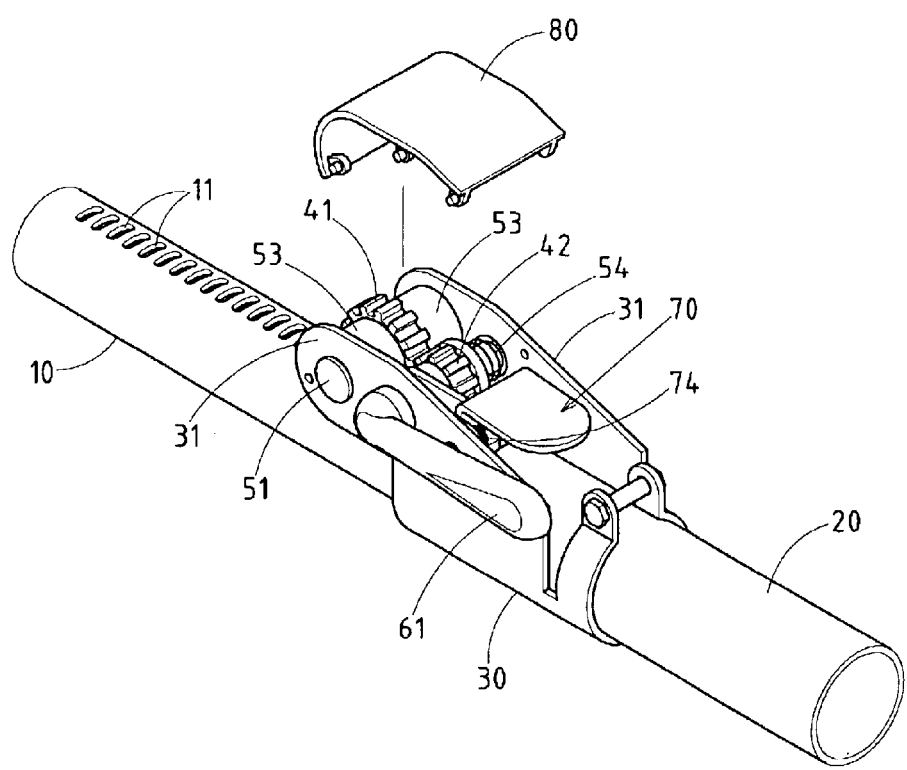
FIG. 2 shows a partial exploded view of the first preferred embodiment of the present invention.
Figure 3:
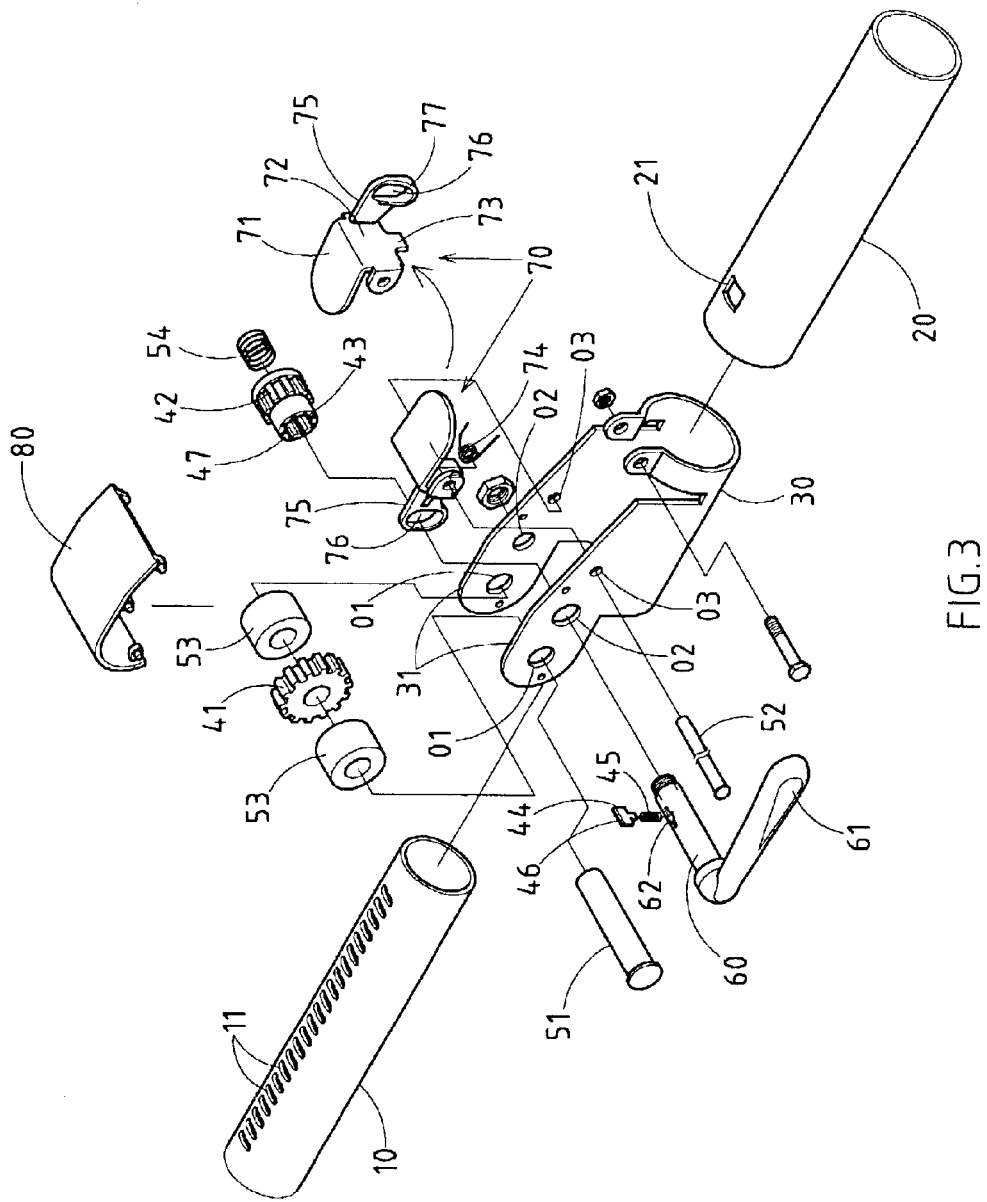
FIG. 3 shows a complete exploded view of the first preferred embodiment of the present invention.
Figure 4:
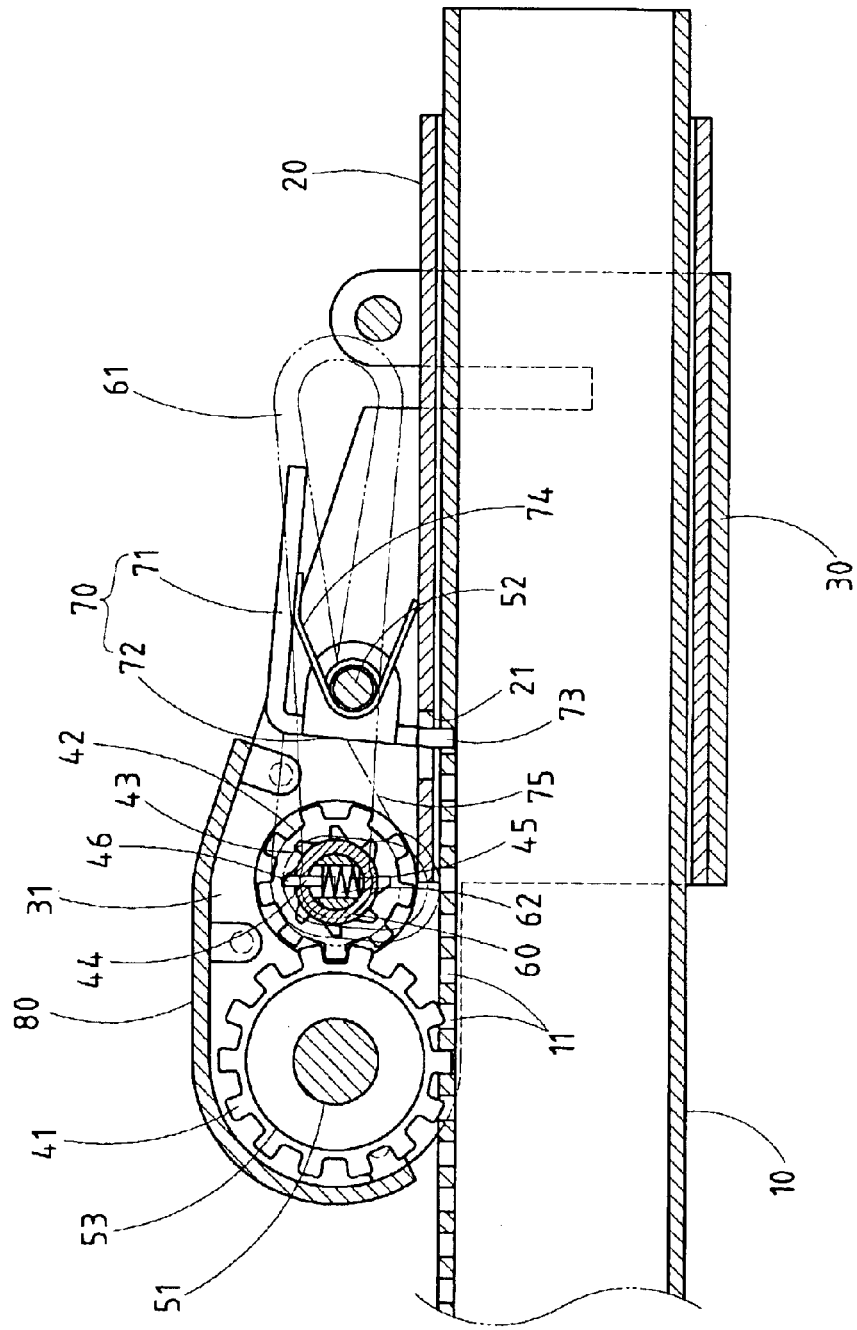
FIG. 4 shows a longitudinal sectional view of the first preferred embodiment of the present invention in combination.
Figure 5:
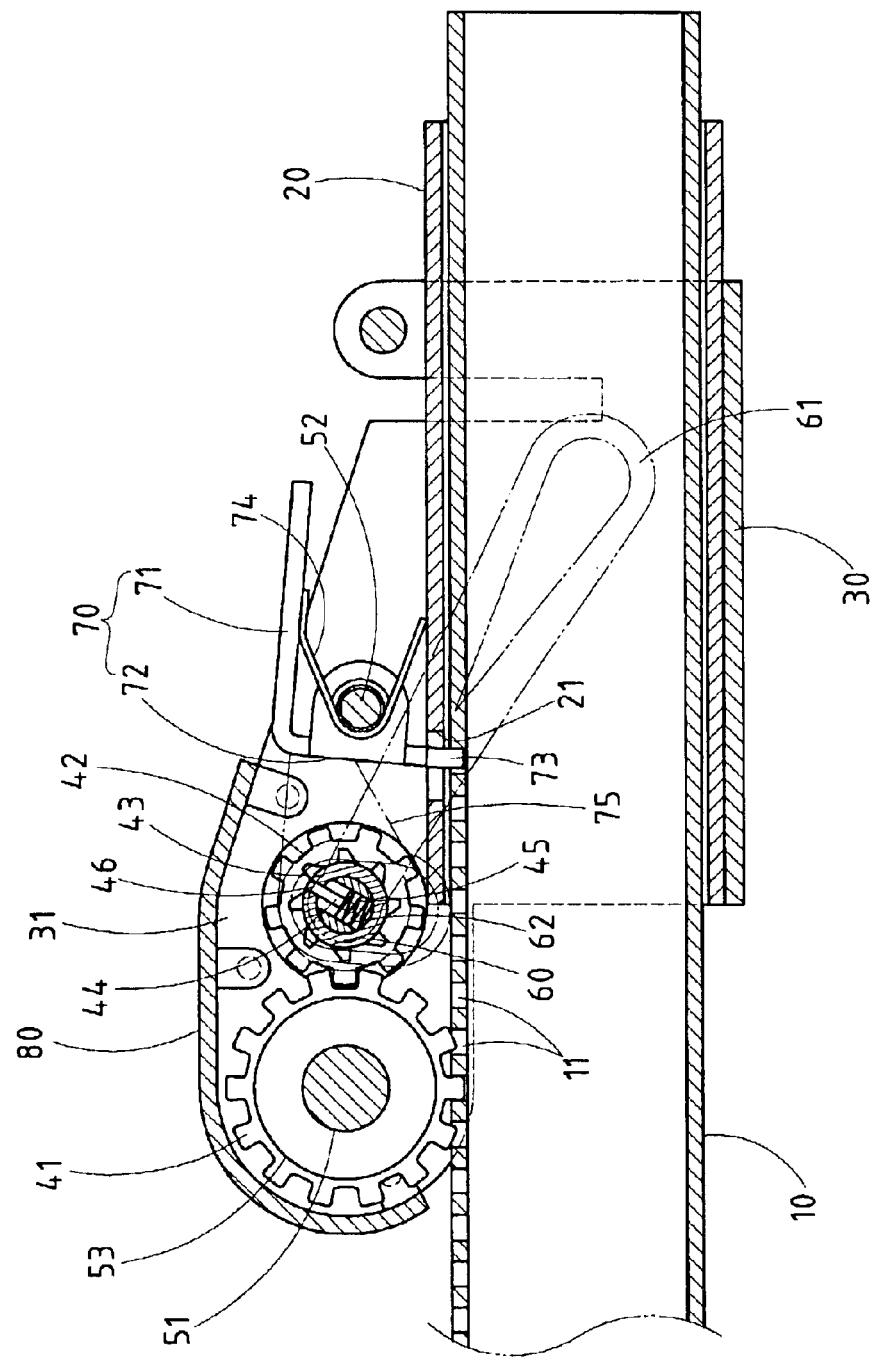
FIG. 5 is a longitudinal sectional view to show the disengagement of the second gear with the actuating shaft of the first preferred embodiment of the present invention.
Figure 6:
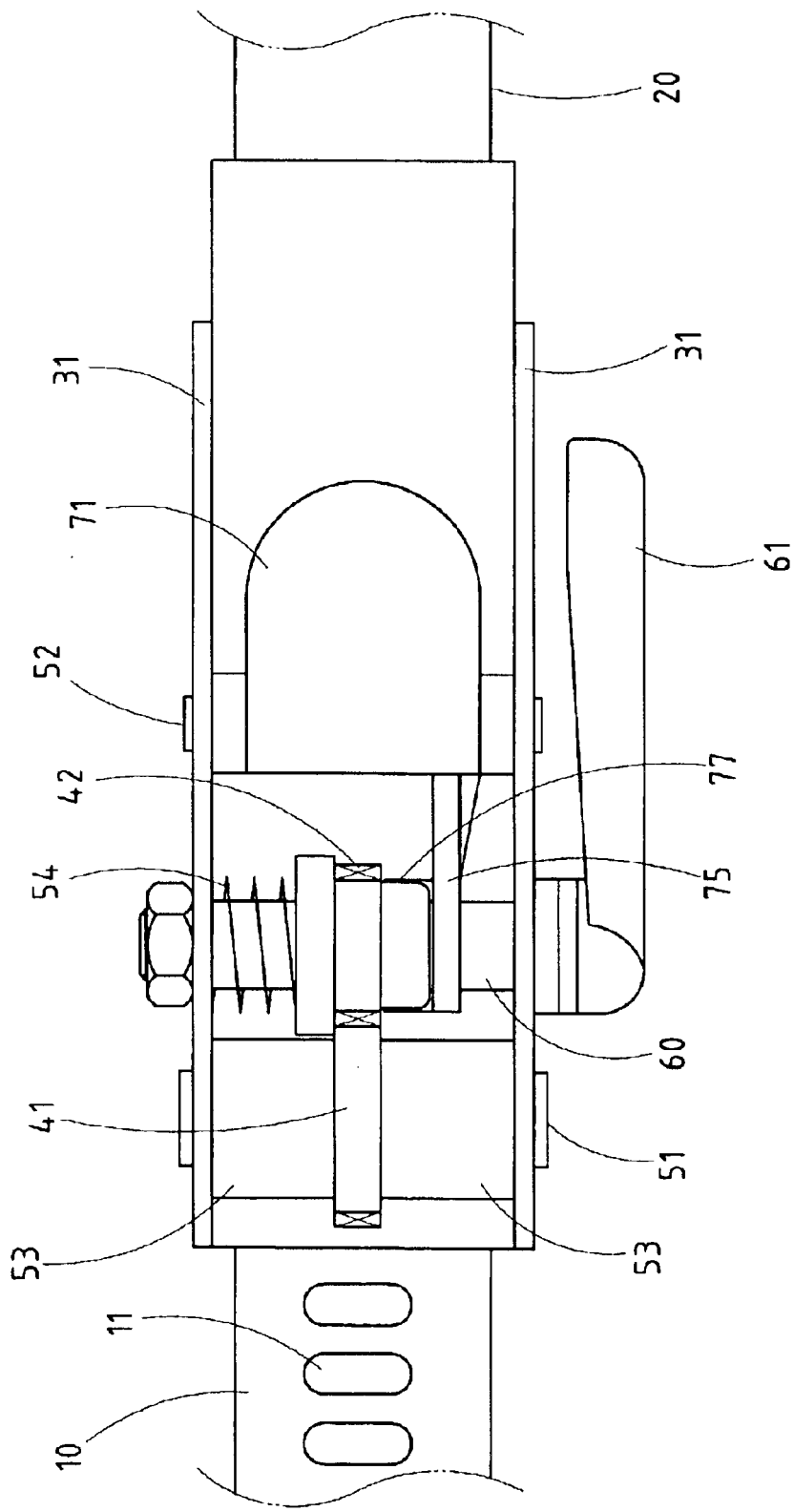
FIG. 6 is a top plan view to show the engagement of the first gear with the second gear of the first preferred embodiment of the present invention.
Figure 7:
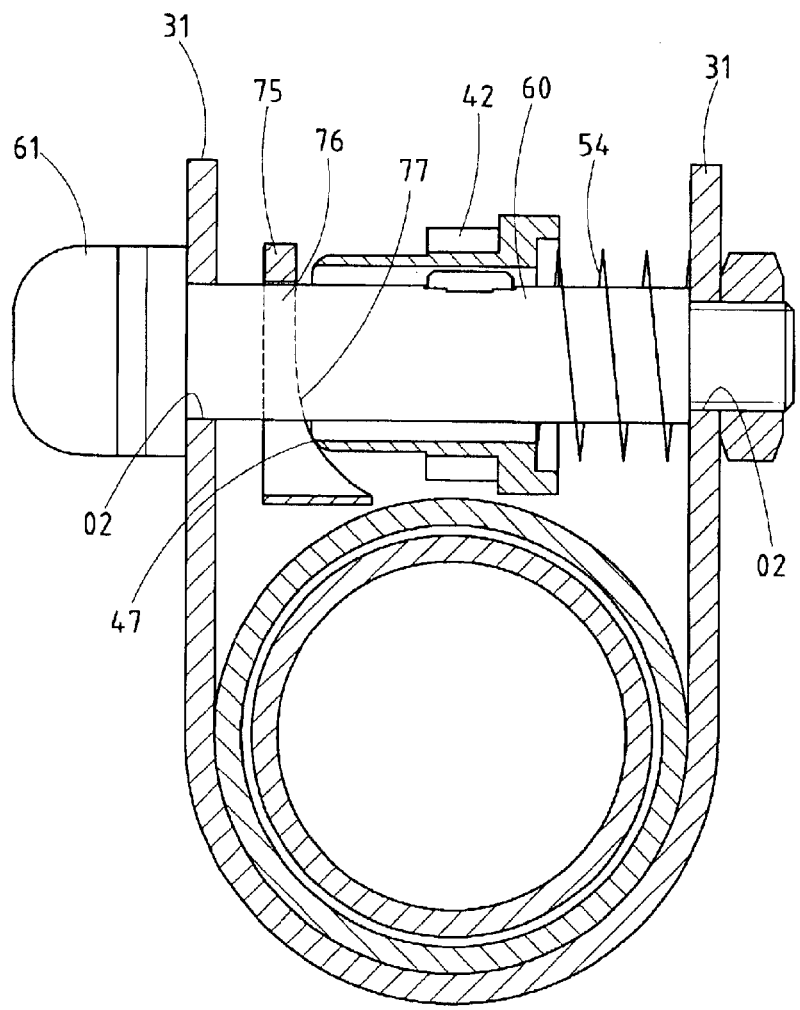
FIG. 7 shows a cross-sectional view of the first preferred embodiment of the present invention in combination.

As shown in FIGS. 1–10, an expandable rod of the present invention comprises an inner tube 10, an outer tube 20, a support frame 30, a first gear 41, a second gear 42, a locating member 70, and a frame cover 80.

The inner tube 10 is provided in an outer wall with a series of gear slots 11, which are arranged at an interval along a longitudinal direction of the inner tube 10. The inner tube 10 is slidably fitted into the outer tube 20. The outer tube 20 is provided at one end with a through hole 21 corresponding in location to the gear slots 11 of the inner tube 10.

The support frame 30 is mounted on the one end of the outer tube 20 and is provided with two lugs 31, each having a first shaft hole 01, a second shaft hole 02, and a third shaft hole 03.

The first gear 41 is mounted on a first shaft 51 in conjunction with two shaft sleeves 53. The first fhaft 51 is mounted in the support frame 30 such that the first shaft 51 is fastened at both ends thereof with the first shaft holes 01 of the two lugs 31 of the support frame 30. The first gear 41 is engaged with the gear slots 11 of the inner tube 10.

Figure 8:
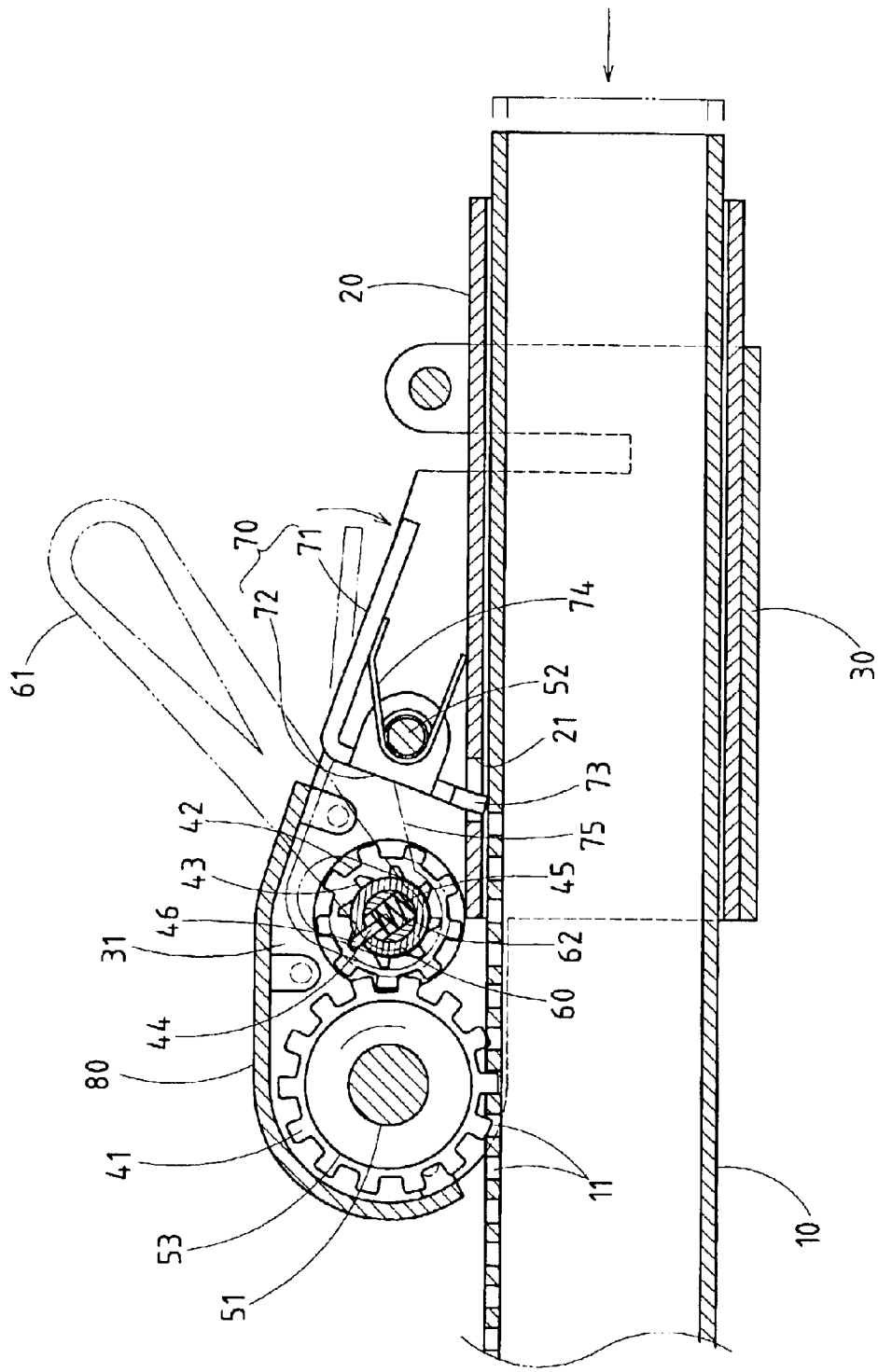
FIG. 8 shows a longitudinal sectional view of the first preferred embodiment of the present invention in action.

The second gear 42 is mounted on an actuating shaft 60 which is fastened at both ends with the second shaft holes 02 of the two lugs 31 of the support frame 30. The second gear 42 is engaged with the first gear 41 and is urged by a spring 54 which is fitted over one end of the actuating shaft 60. The second gear 42 has one end 47 which is provided with a single bevel edge 43. The actuating shaft 60 is provided in an outer wall with a retaining slot 62 for accommodating an actuating piece 44 in conjunction with a spring 45. The actuating piece 44 has a single bevel edge 46 which is jutted out of the retaining slot 62 and is capable of engaging the single bevel edge 43 of the one end 47 of the second gear 42 at the time when the actuating shaft 60 is turned counterclockwise, thereby driving the second gear 42 to turn, as illustrated in FIG. 8. As the actuating shaft 60 is turned clockwise, the single bevel edge 46 of the actuating piece 44 of the actuating shaft 60 is disengaged with the single bevel edge 43 of the second gear 42. As a result, the second gear 42 is no longer driven by the actuating shaft 60 to turn.

The locating member 70 is pivoted to the support frame 30 by a pivot 52 which is fastened to the third shaft holes 03 of the two lugs 31 of the support frame 30. The locating member 70 is formed of a press portion 71 and a locating portion 71 which is provided with a locating projection 73 capable of locating in one of the gear slots 11 of the inner tube 10 via the through hole 21 of the outer tube 20. The locating portion 72 is provided with a protuberance 75 having a pivoting hole 76 by which the protuberance 75 is pivoted to the actuating shaft 60. The pivoting hole 76 is provided in the inner wall with a guide edge 77, which rests against the one end 47 of the second gear 42 at the time when the press portion 71 is pressed, thereby causing the second gear 42 to displace so as to disengage the first gear 41, as shown in FIGS. 9 and 10.

The first gear 41 and the second gear 42 are shielded by a frame cover 80 which is fastened to the two lugs 31 of the support frame 30.

The actuating shaft 60 is fastened at one end with a handle 61 to facilitate the turning of the actuating shaft 60. When the handle 61 is turned counterclockwise as shown in FIG. 8, the second gear 42 is actuated to drive the first gear 41 to turn, thereby causing the inner tube 10 to move in relation to the outer tube 20.

Figure 9:
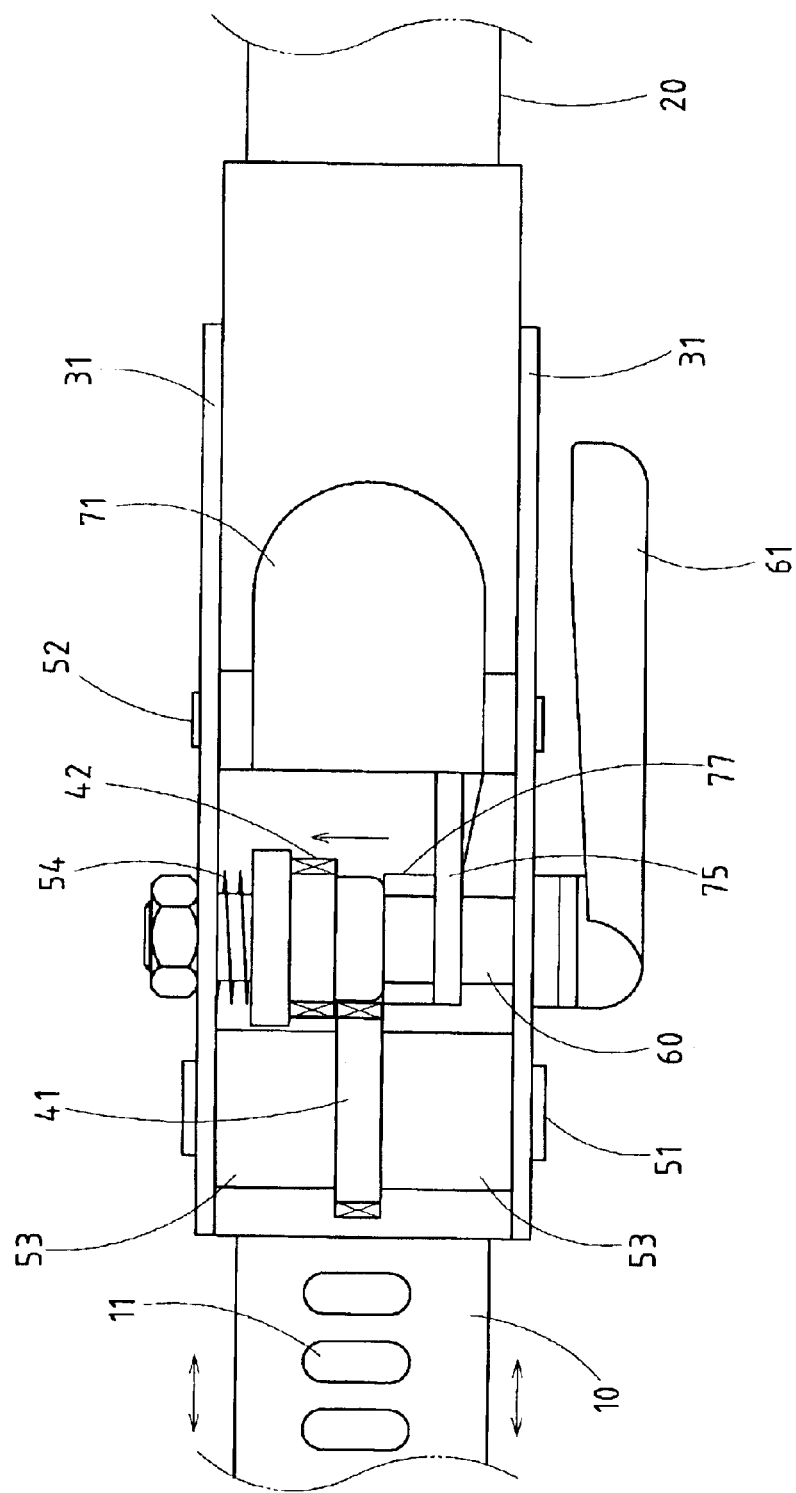
FIG. 9 is a top plan view to show the disengagement of the first gear with the second gear of the first preferred embodiment of the present invention.
Figure 10:
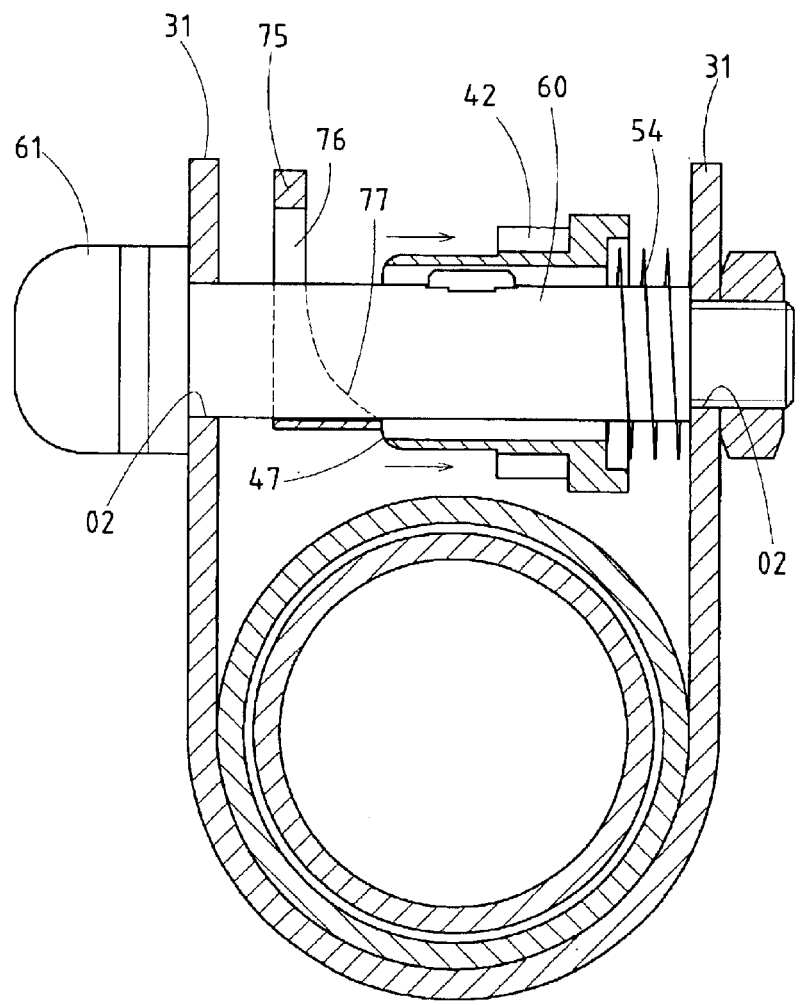
FIG. 10 shows a cross-sectional view of the first preferred embodiment of the present invention as shown in FIG. 9.

As illustrated in FIGS. 9 and 10, when the locating member 70 is pressed, the protuberane 75 of the locating member 70 moves upward to cause the second gear (drive gear) 42 to displace so as to become disengaged with the first gear 41 (drive gear). As a result, the inner tube 10 can be easily slid into or out of the outer tube 20.

Figure 11:
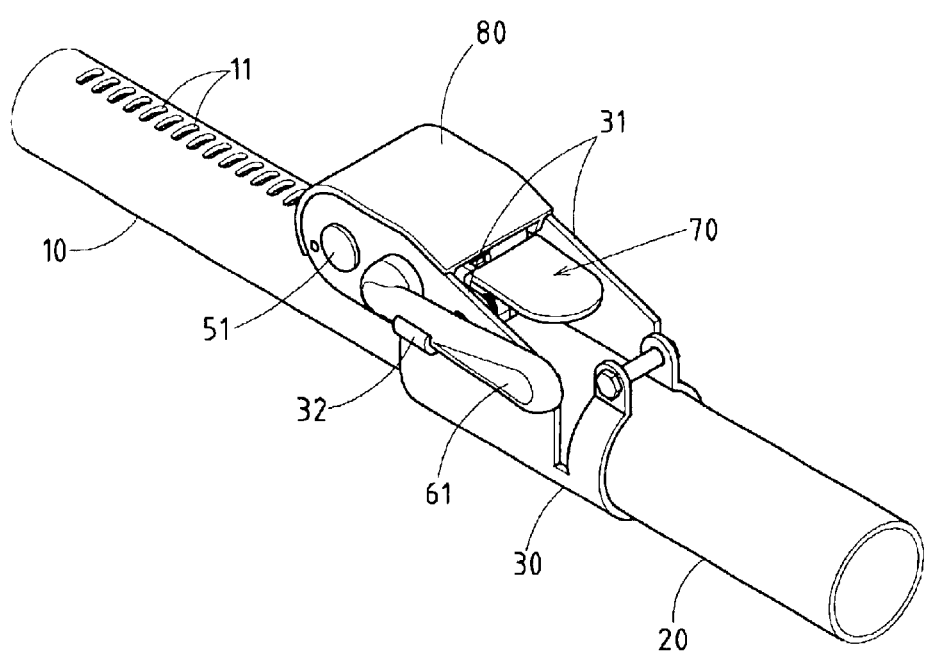
FIG. 11 shows a perspective view of a second preferred embodiment of the present invention.

As shown in FIG. 11, the support frame 30 is provided with an arresting piece 32 for confining the handle 61 in such a way that the handle 61 can not be turned in a full circle. Without the arresting piece 32, the handle 61 can be turned freely at 360 degrees.

The embodiments described above are to be regarded in all respects as being illustrative and nonrestrictive. Accordingly, the present invention may be embodied in other specific forms without deviating from the spirit thereof. The present invention is therefore to be limited only by the scopes of the following claims.

I claim:

1. An expandable rod comprising:

an outer tube provided at one end with a through hole;

an inner tube slidably fitted into said outer tube and provided in an outer wall thereof with a plurality of gear slots which are arranged at intervals along a longitudinal direction of said inner tube such that said gear slots are corresponding in location to said through hole of said outer tube;

a support frame mounted on the one end of said outer tube;

a drive gear mounted in said support frame by an actuating shaft such that said drive gear is actuated by said actuating shaft whereby said actuating shaft is fastened at one end with a handle to facilitate the turning of said actuating shaft;

a driven gear mounted in said support frame such that said driven gear is engaged with said drive gear, and said gear slots of said inner tube whereby said driven gear is driven by said drive gear to actuate said inner tube to move in relation to said outer tube at the time when said actuating shaft is turned counterclockwise;

a locating member provided with a locating projection and pivoted to said support frame such that said locating projection is located in one of said gear slots of said inner tube via said through hole of the one end of said outer tube; and a frame cover pivoted to said support frame to shield said drive gear and said driven gear.

2. The expandable rod as defined in claim 1, wherein said support frame is provided with an arresting piece to confine said handle of said actuating rod.

3. The expandable rod as defined in claim 1, wherein said locating member is provided with a pivoting hole for pivoting said locating member with said actuating shaft whereby said pivoting hole is provided in an inner wall with a guide edge capable of causing said drive gear to disengage said driven gear at the time when said locating member is exerted on by an external force.

4. The expandable rod as defined in claim 1, wherein said drive gear is provided at one end with a single bevel edge; wherein said actuating shaft is provided with a single bevel edge capable of engaging said single bevel edge of said drive gear at the time when said actuating shaft is turned counterclockwise whereby said single bevel edge of said actuating shaft is disengaged with said single bevel edge of said drive gear at the time when said actuating shaft is turned clockwise.

* * * * *